(No Model.)

O. SAWYER.
BELT GUIDE AND SUPPORT.

No. 445,382. Patented Jan. 27, 1891.

WITNESSES
INVENTOR:

UNITED STATES PATENT OFFICE.

OLIVER SAWYER, OF EAST TEMPLETON, MASSACHUSETTS.

BELT GUIDE AND SUPPORT.

SPECIFICATION forming part of Letters Patent No. 445,382, dated January 27, 1891.

Application filed May 5, 1890. Serial No. 350,614. (No model.)

*To all whom it may concern:*

Be it known that I, OLIVER SAWYER, of East Templeton, in the county of Worcester and State of Massachusetts, have invented certain new and useful Improvements in Belt Guides and Supports, of which the following is a specification.

This invention relates chiefly to devices for guiding and supporting abrasive belts used for scouring and polishing convex surfaces on articles of wood, metal, &c., such belts being parts of organized machines, of which a type is shown in Letters Patent of the United States, No. 241,429, granted to me May 10, 1881, for improvements in sanding-machines. In such machines the operating-belt coated with sand, emery, or other abrasive material is supported by suitably-arranged guiding-pulleys mounted in fixed bearings, the work being pressed against the belt at a point between two of said pulleys where the belt is not rigidly backed or supported, it being necessary that the belt be free to yield and conform to the convex surface of the work. This necessary yielding quality of the belt is, however, a source of difficulty when the shape of the work is such that it does not bear entirely across the belt, but presses upon a limited extent of the width of the belt. Under these circumstances if the article bears on the belt near one edge of the latter the belt is very liable to be displaced edgewise and elude or slip away edgewise from the work, so that it is very difficult to keep the work properly in contact with the belt.

My invention has for its object to obviate this objection and to provide automatic means for removing the belt edgewise in a direction opposite to the direction in which it is displaced by contact of the work with it when the work bears on the belt at one side of the center, so that the said displacement of the belt will be practically neutralized.

The invention also has for its object to provide guides of improved construction to bear against the edges of the belt near one of its supporting-pulleys and aid in preventing lateral displacement of the belt.

To these ends the invention consists in the improvements which I will now proceed to describe and claim.

Figure 1:
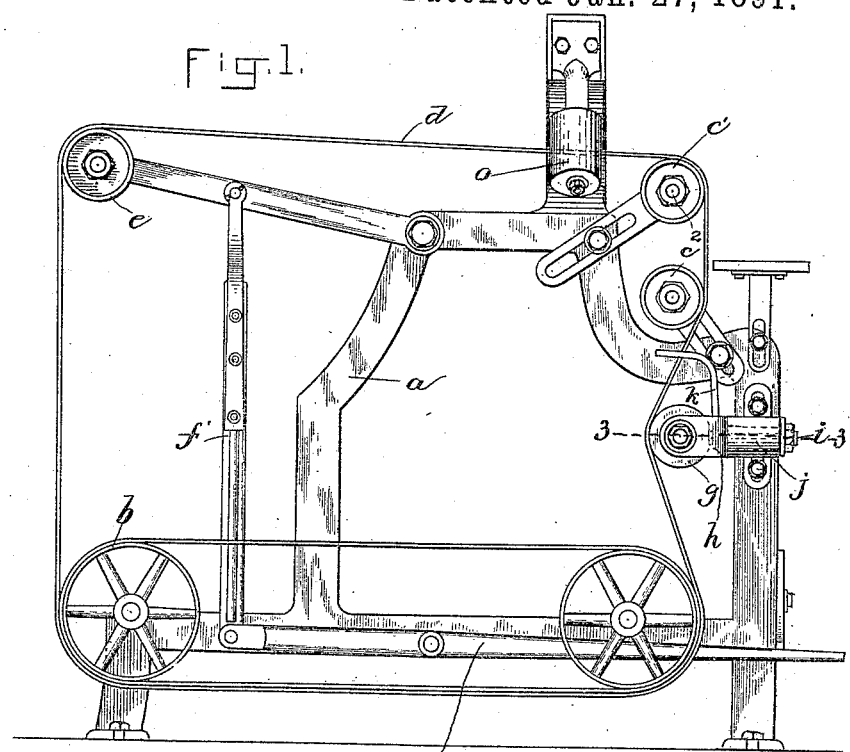
Figure 2:
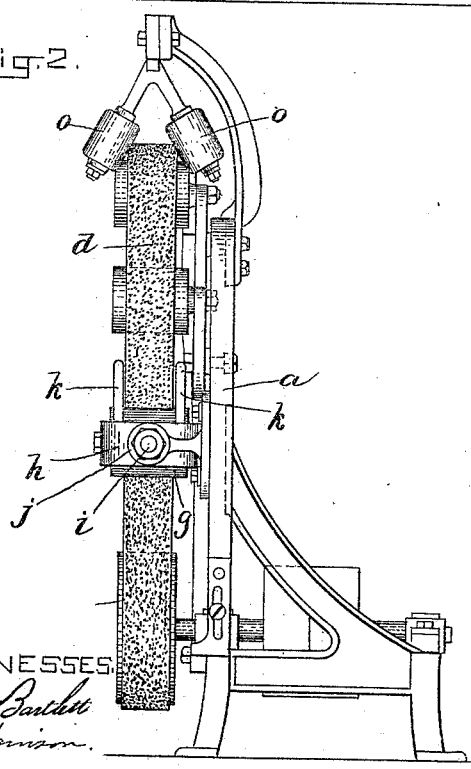
Figure 3:
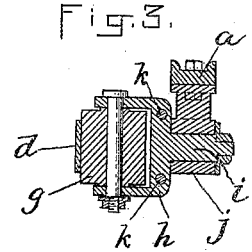

In the accompanying drawings, forming a part of this specification, Figure 1 represents a side elevation of an organized sanding-machine embodying my invention. Fig. 2 represents an end elevation of the same. Fig. 3 represents a section on line 3 3, Fig. 1.

The same letters of reference indicate the same parts in all of the figures.

In the drawings, $a$ represents a supporting-frame of any suitable form, on which is the driving-pulley $b$ and a suitable number of idle-pulleys $c'$ $c^2$ for the support and guidance of the belt $d$, said pulleys being journaled on fixed bearings. Said bearings may be adjustably secured to the supporting-frame by means of slotted plates or brackets and bolts passing through the slots in said brackets into the supporting-frame; but in all cases the said bearings are fixed or rigidly held when the machine is in operation. Said belt in the machine here shown is provided with an abrading-surface, and is kept under a state of tension and enabled to yield by means of a movable tightening-pulley $e$, which is pressed by a lever $f$ and connecting-cord $f'$ against the belt, as shown in my above-named patent. The work is presented to the belt at a point between the supporting-pulleys $c'$ $c^2$, and it is at this point that the belt is liable to be displaced edgewise when the work bears against it near one edge only.

In carrying out my invention I provide near the pulley $c^2$ a pulley $g$, which is arranged to bear on and deflect the belt $d$, so that the belt will bear with considerable force on the said pulley. The pulley $g$ is journaled in a holder $h$ on a stud $i$, Fig. 3, which is mounted to turn or rotate in a fixed socket or bearing $j$ on the supporting-frame, so that the axis of the pulley $g$ may assume different positions, and may be either parallel with or at an angle to the axes of the belt-supporting rolls $c'$ $c^2$. To the holder $h$ are affixed arms $k$ $k$, projecting outwardly in position to bear lightly on the edges of the belt $d$. It will be seen that when the belt is displaced edgewise by the unequal pressure of the work against it, as above described, between the pulleys $c'$ $c^2$, one edge of the belt pressing against one of the arms $k$ will cause the holder $h$ to turn or partially rotate in its bearing $j$, and thus incline the axis of the pulley $g$ relatively to the axes of the pulleys $c'$ $c^2$.

It is well-known that a belt pressed closely against a pulley will be guided by the latter in a direction at right angles with the axis of the pulley. Hence it will be seen that when the pulley $g$ is inclined, as described, by the edgewise displacement of the belt the inclined periphery of the pulley, acting on the belt, will give the latter an edgewise movement in a direction opposite the direction of the displacing movement, and thus neutralize the displacement of the belt. When the displacing pressure is removed from the belt, or when the pressure is equalized across the belt, the portion of the belt between the arms $k$ $k$ resumes its normal position, so that the pulley $g$ is restored to parallelism with the belt-supporting pulleys $c'$ $c^2$. I have found that by the use of this simple device the liability of displacement of the belt by pressure of the work near one of its edges is so far neutralized that work presenting a surface area too small to extend across the belt can be held in contact with the belt without difficulty. The oscillating pulley $g$ is preferably arranged at that side of the belt-supporting pulleys $c'$ $c^2$ toward which the belt is moved by the driving-pulley, the tension on the belt at this point being the greatest, so that the pressure of the belt against the oscillating pulley is greater than it would be if the latter were located at the opposite side of the pulleys $c'$ $c^2$. Hence the belt is more readily controlled by changes in the position of the oscillating pulley. The direction in which the belt is moved is such that the belt moves downwardly from the pulley $c'$ to the pulley $c^2$.

$o$ $o$ represent two inclined pulleys arranged to bear against the edges of the belt at the opposite side of the pulleys $c'$ $c^2$ from the oscillating pulley $g$. Said pulleys prevent lateral displacement of the belt at the point where they are located. The inclination of one pulley $o$ is opposite that of the other, as shown in Fig. 2. The object of the inclination of said pulleys $o$ $o$ is to prevent them from doubling or turning the edges of the belt under sufficiently to cause the belt to fold or crease as it passes over the pulley $c'$. The pulleys $o$ $o$ are in such close contact with the edges of the belt that they press its edges inwardly, and if they were not oppositely inclined, as shown, they would be liable to turn the edges of the belt under the main or central portion, so that it would pass in a folded condition over the pulleys $c'$ $c^2$, and its usefulness would be impaired. I do not limit myself, however, to the conjoint use of the oscillating pulley $g$ and to the inclined edge guiding-pulleys $o$ $o$, but may use either independently, or I may use another oscillating pulley with the accompanying arms $k$ $k$ in place of the inclined pulleys $o$ $o$.

The oscillating pulley and its accompanying arms may be used in connection with belts for other purposes, such as for transmitting power, without departing from the spirit of my invention.

Although I have particularly described the application of my improvements to a sanding-machine, I do not limit myself in this particular, but may use said improvements in connection with any abrading belt without regard to the construction or adaptation of the organized machine of which said belt forms a part. The oscillatory pulley is here shown as bearing against the outer side of the belt, this being probably the most convenient arrangement; but it is obvious that said pulley may be arranged to bear against the inner side of the belt without material change. The edge guiding-pulleys $o$ $o$ may be inverted from the position shown in Fig. 2, so that their upper ends will be farther apart than their lower ends.

I claim—

1. The combination, with a driven belt and supporting-pulleys therefor journaled in fixed bearings, of an oscillatory pulley the shaft or axle of which is adapted to oscillate and stand either parallel with the axes of the belt-supporting pulleys or at an angle thereto, and arms connected with said oscillatory pulley and arranged at opposite edges of the belt, whereby edgewise displacement of the belt in either direction is caused to incline the axis of the oscillatory pulley and neutralize such displacement, as set forth.

2. The combination, with a driven belt and supporting-pulleys therefor journaled in fixed bearings, of an oscillatory pulley in frictional contact with the belt, a holder for said pulley mounted to turn or rotate in a bearing at right angles with the bearings for the belt-supporting pulleys, and arms attached to said holder and arranged at opposite edges of the belt, as set forth.

3. The combination, with a driven belt and supporting-pulleys therefor, of oppositely-inclined edge guiding-pulleys bearing against the edges of said belt, as set forth.

4. The combination, with a driven belt and supporting-pulleys therefor, of oppositely-inclined edge guiding-pulleys bearing against the edges of said belt, said edge guiding-pulleys being located at one side of a pair of the belt-supporting pulleys, an oscillatory pulley in frictional contact with said belt at the opposite side of said pair of supporting-pulleys, and arms connected with said oscillatory pulley and bearing against the edges of the belt, as set forth.

In testimony whereof I have signed my name to this specification, in the presence of two subscribing witnesses, this 30th day of April, A. D. 1890.

OLIVER SAWYER.

Witnesses:
C. F. BROWN,
A. D. HARRISON.